United States Patent

Smith

[15] 3,697,186
[45] Oct. 10, 1972

[54] HARD START TOOL HOLDER

[72] Inventor: Theodore M. Smith, Detroit, Mich.

[73] Assignees: Lucille G. Smith; Theodore M. Smith, Detroit, Mich. ; trustees of the Theodore M. Smith Trust

[22] Filed: Oct. 12, 1970

[21] Appl. No.: 79,818

[52] U.S. Cl....................408/142, 10/89 F, 10/135 R
[51] Int. Cl. ..............................................B23q 5/22
[58] Field of Search..............408/141, 142, 238, 239; 279/16; 10/89 F, 141 H, 129 R, 135 R

[56] References Cited

UNITED STATES PATENTS

| | | | |
|---|---|---|---|
| 3,381,550 | 5/1968 | Smith | 408/16 |
| 1,527,757 | 2/1925 | Street | 10/89 F |

*Primary Examiner*—Francis S. Husar
*Attorney*—Cullen Settle Sloman & Cantor

[57] ABSTRACT

A compensating hard start tool holder for taps, drills, reamers, boring tools, counterbores and milling cutters, having a tool holding chuck and a power rotated longitudinally fed shank, having an operative drive and longitudinally feed relationship between said shank and chuck with springs interposed normally resisting compressive movements of the parts towards each other and normally biasing said parts outwardly of each other, which includes a yieldable restraining means on the shank and a cam means on the chuck to provide yieldable resistance against relative movement of said shank and chuck towards each other to provide an initial high end thrust of the tool relative to the workpiece and, whereby, upon an extreme resistance between the tool and workpiece, said yieldable restraining means is overcome to provide such relative longitudinal movement of said shank and chuck towards each other preventing damage to the tool, to the tool holder or to the drive spindle, or to the workpiece.

5 Claims, 2 Drawing Figures

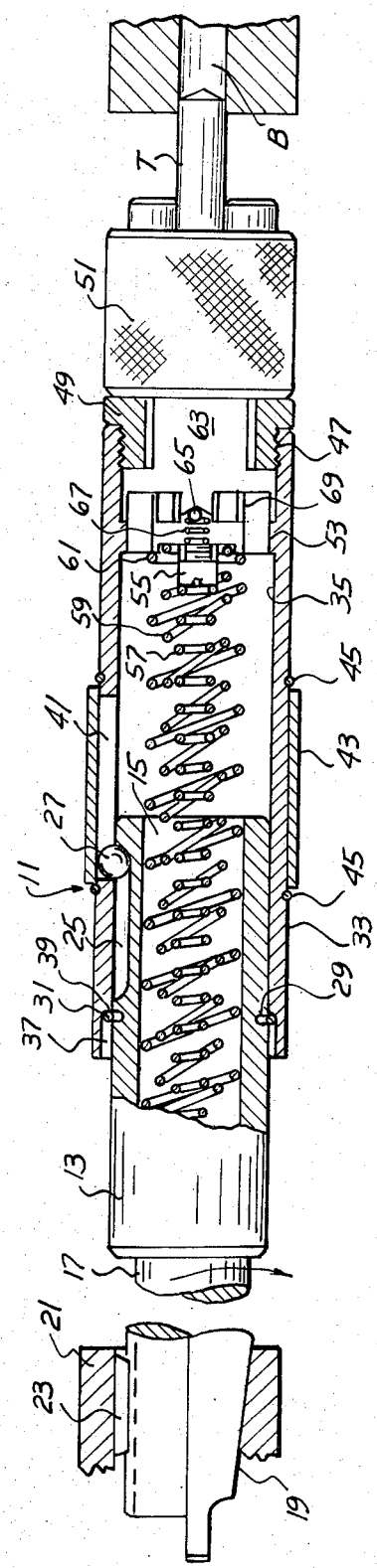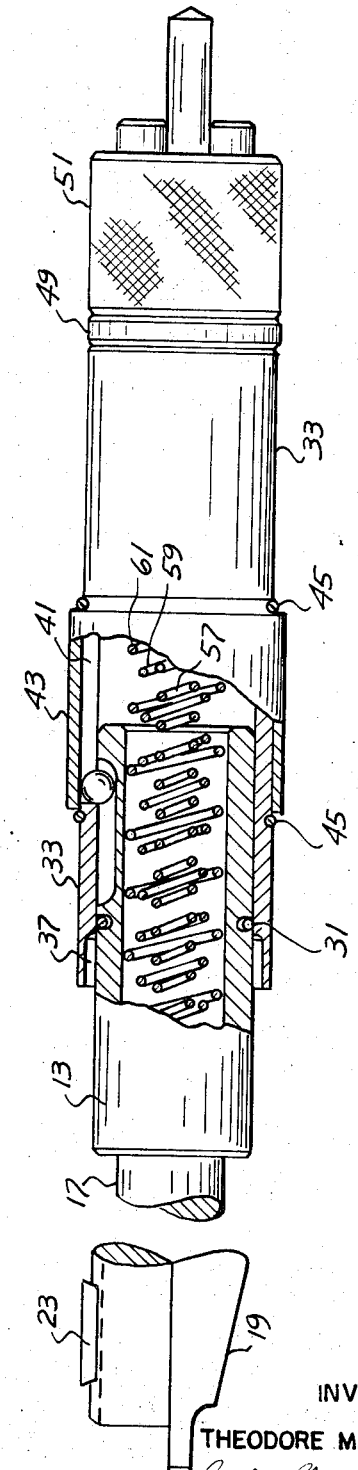

3,697,186

HARD START TOOL HOLDER

BACKGROUND OF THE DISCLOSURE

Heretofore, in the use of tool holders for taps, drills, reamers, boring tools, counterbores and milling cutters and particularly for taps but not limited thereto, while it was advantageous in the compensating type of tool holder that there by normal longitudinal movement of the tool holder parts toward each other during the machining operation, it is often desired that there by an initial high end thrust of the tool upon the workpiece, which can be accomplished only if some means are provided which will normally resist relative compressive movement of the shank and chuck towards each other at the start of the machining operation.

Various efforts have been made to accomplish this result and, wherein, no suitable simple and inexpensive means have been accomplished which will produce the desired result, namely, an initial at least normal restraint between the parts of the tool holder which will resist such relative longitudinal movement except where there is an extreme resistance encountered.

BRIEF DESCRIPTION OF THE INVENTION

It is an object of the present invention to provide in a compensating tool holder which includes a normal relatively movable shank and chuck with spring means yieldably resisting relative movement of the parts towards each other and normally biasing the parts outwardly of each other, an improved yieldable restraining means interposed between the respective parts whereby, upon initial rotary drive and longitudinal feed of the shank and engagement of the tool and workpiece, such yieldable restraining means will function to prevent relative longitudinal movement of said parts to thus provide an initial high end thrust of the tool upon the workpiece and wherein, under normal conditions, said high end thrust will be maintained, unless and until an extreme resistance is encountered between the workpiece and tool. In such a case, the yieldable restraining means will yield in such a manner as to permit such relative longitudinal movement of the parts as will prevent damage either to the tool, the tool holder, the workpiece or the spindle drive.

It is another object to provide a means to reset the tool after an initial high end thrust, after the tool disengages the workpiece.

It is another object of the present invention to provide yieldable restraining means which incorporates upon the shank a radially adjustable snap ring normally extending radially outward of the said shank and is adapted to engage a portion of the chuck to normally resist such relative longitudinal movement and wherein, said chuck includes cam means which upon receipt of relative extreme axial pressures, will be effective to bias the snap ring radially inward within a corresponding annular groove in said shank and will, thus, permit relative longitudinal compressive movement of the shank and tool holder towards each other.

THE DRAWINGS

These and other objects will be seen from the following specification and claims in conjunction with the appended drawings.

FIG. 1 is a fragmentary partly broken away and sectioned longitudinal view of the present hard start tool holder showing the normal relationship of the tool and workpiece and with the tool holder parts restrained against compressive movement towards each other.

FIG. 2 is a similar view illustrating a malfunction and wherein, the restraining means are overcome and relative longitudinal movement between the tool holder parts results.

It will be understood that the above drawing illustrates merely a preferred embodiment of the invention by way of illustration of an operative device, and that other embodiments are contemplated within the scope of the claims hereafter set forth.

DETAILED DESCRIPTION OF THE INVENTION

Referring to the drawings, the present hard start holder 11, FIGS. 1 and 2, includes elongated shank 13 having a longitudinal bore 15 opening at one end thereof, and at its opposite end having shaft 17, which includes suitable morse taper 19 for projection and securing into the spindle head 21 with a suitable locking key 23 interposed, said assembly being fragmentarily shown in FIGS. 1 and 2.

The shank includes at least 3 angularly related elongated ball grooves 25, and rearwardly of said grooves and upon the exterior of shank 13 annular shank groove 29.

Flexible resilient snap-ring 31 registers with shank groove 29, partly extends thereinto but a substantial portion of said snap-ring projects radially outward thereof as best shown in FIG. 1.

Said hard start holder includes elongated chuck body 33 having an elongated bore 35 therethrough, which at one end terminates in the counterbore 37 which normally receives and encloses snap-ring 31 mounted upon said shank.

In the normal assembly of the parts, said shank projects into bore 35 of the chuck body so that the snap-ring 31 carried thereby is normally in engagement with the inclined cam surface 39 formed at the inner end of counterbore 37, but which cam surface is inclined radially inward and forward as shown in FIG. 1.

Extending radially through the wall of said chuck body are a corresponding series of transverse ball slots 41 adapted to receive the corresponding ball, for illustration, compensating balls 27. Cylindrical ball cage 43 is mounted upon chuck body 33 and is retained thereon by the pair of longitudinally spaced snap rings 45, which nest within corresponding exterior annular grooves in the chuck body and for the purpose of holding the ball cage 43 in such position as to retain balls 27 in the assembled relationship shown in FIGS. 1 and 2.

By this construction, rotary drive of the spindle head 21 transmitted to the shank 13 as indicated by the arrow FIG. 1, is adapted to effect corresponding rotary movement of the chuck body 33, and by virtue of the corresponding grooves 25 and slots 41 and the said balls 27 provide for compensating relative movements between the respective shank and chuck body in a manner which is conventional in the art.

The forward end of the chuck body 35 includes upon its bore, threaded portion 47 into which is projected the shank 49 of the quick-change chuck assembly 51 which mounts the tool T which may be a tap, a drill, a reamer, a boring took, a counterbore or a milling cutter for illustration.

The workpiece W is fragmentarily shown including pre-drilled bore B into which a tool T, such as a tap, is normally projected for a tapping operation, for example, though not limited thereto.

FIG. 1 illustrates a normal positioning of the parts, and wherein as hereafter explained in detail, there is provided an initial high-axial thrust of the tool T with respect to the workpiece W for the initiating of the boring or tapping or other operation.

As part of conventional chuck assemblies, there is shown herein float compensating drive pin assembly 53 which is mounted within and secured within bore 35 of the chuck body and includes at 55 a centering and retaining screw.

Suitable spring means is interposed between the respective shank and chuck body axially centered with respect to their respective bores so as to normally urge respective shank and chuck body outwardly with respect to each other and to resist relative longitudinal movement of the two parts towards each other, which is a normal conventional construction.

In the preferred embodiment there is provided three elongated concentrically arranged coil springs 57, 59 and 61 normally interposed between the respective shank and chuck body as shown in FIG. 1.

It is noted that the inner most coiled compression spring 57 engages the head of the centering screw 55 whereas the intermediate spring 59 is centered with respect to said screw and wherein the outer most coil spring 61 at the end within the chuck body bears against the float compensating drive pin assembly 53.

As a part of conventional chuck assembly, there is provided a float 63 which projects into the float compensating drive pin assembly yieldably bears against float compensator centering ball 65 and the interposed compression float compensator centering spring 67 for functioning in a conventional manner and wherein there is also included adjustable float compensator 69.

Though forming no part of the present invention, the drive pin assembly 53 is interlocked with the interior of the chuck 33 and mounts the adjustable float compensator 69. The latter, interlockingly and adjustably receives inner end portion of the float 63, who opposite end is adapted for interlocking driving engagement with the tool holding chuck assembly 51.

In the conventional compensating tool holder in the normal operation thereof when the shank is power driven and fed longitudinally inward towards the work piece W, the axially mounted chuck body is similarly projected forward until the tool T is in engagement with the work piece W at which time there may be some limited initial compressive movement of the shank 13 and chuck body 33 towards each other against the action of the coil springs 57, 59 and 61.

This is possible, due to the ball and slot arrangement above described with respect to balls 27 and the corresponding opposed grooves and slots 25, 41.

Thus, there is provided a conventional operating structure wherein rotative drive is directed to the chuck body 33 and at the same time the tool holder assembly is adapted so as to normally provide for relative longitudinal movement of the shank and chuck body towards each other compressively against the respective springs 57, 59 and 61.

For the purpose of the present invention, there is provided within the present tool holder assembly, a hard start mechanism in the nature of a yieldable restraining means which is normally interposed between said shank and chuck body so as to prevent further longitudinal compressive movement of the two parts towards each other. This, thus, would result in an initial high axial thrust longitudinally of the tool T upon the workpiece W that couldn't otherwise be accomplished if the shank and chuck body were permitted relative longitudinal movement towards each other just as soon as the tool engaged the workpiece, which is a characteristic of most compensating tool holders.

In the present construction the snap ring 31 is partly nested within shank annular groove 29 and is in such position as to normally block relative compressive movement of shank 13 and chuck body 33 towards each other. It is noted in FIG. 1 that the said snap ring mounted upon the shank in registry with the radial shank groove 29 retainingly engages the inwardly and forwardly inclined cam surface 39 at the inner end of counterbore 37 of the chuck body 33 to thus resist relative movements of the shank and chuck body towards each other at the start of the tooling operating or tapping operation as the case may be.

There is thus provided an initial increased longitudinal pressure on the chuck body 33 and the tap T for initial increased starting pressure of the tap T for example with respect to the workpiece W as shown. This increased pressure under normal operation may continue or will continue at which time the respective parts, namely the shank 13 and the chuck body 33, are yieldably restrained against compressive movement towards each other by virtue of the said blocking snap ring 31.

Further, resistance of movement towards each other of the said parts is achieved by the set of three compression springs 57, 59 and 61 interposed between the respective parts.

As a safety factor and as forming a part of the present hard start holder, if extreme resistance to a tooling or tapping operation is encountered with respect to the workpiece W, which could be produced by the existence of no tool, a broken tool or an improperly set tool, or for any other factor, this increased resistance to tooling will produce an increased axial thrust upon the chuck body which is transmitted through the cam surface 39 to the snap ring 31.

This will cause radial inward adjustment of the snap ring within the radial annular shank groove 29 so as to provide such clearance as will permit then a relative longitudinal compressive movement of the shank and chuck body towards each other to a position such as shown in FIG. 2 of the drawings.

This means that with an extreme resistance to tooling or tapping that there is then permitted a relative longitudinal movement of the said parts, such as will prevent damage to the tool holder, to the tool, the workpiece or the drive spindle head to thus prevent damage which is thus avoided in the present construction. Thus, the initial high longitudinal thrust which is often required to start the tooling operation can be maintained by the use of the present cam and snap ring assembly shown at 39 and 31, normally restraining the relative compensating compressive movements of the shank and chuck body towards each other.

It is noted, however, that upon extreme resistance to tooling that the compensating function can still be achieved to protect the parts since the cam 39 functions as intended to cam the snap ring 31 radially inward within the groove 29 sufficient to permit such relative compensating movement of the tool holder parts.

FIG. 2 illustrates the holder parts moved towards each other in a situation where exceptionally high end thrust has been encountered by the tap T. In operation, once the holder has retracted, and the tool has disengaged the workpiece, the respective springs 57, 59 and 61 are effective for the purpose of reseting the tool holder parts to the position shown in FIG. 1 for further operation and for additional tapping or similar functions.

Having described my invention, reference should now be had to the following claims.

I claim:

1. In a compensating hard start tool holder for use with taps, drills, reamers, boring tools, counterbores and milling cutters;
   an elongated chuck having a bore and mounting a tool adapted to operatively engage a workpiece;
   an elongated shank having a bore opening at one end and a shaft at its other end adapted for connection to a source of rotative power and longitudinal feed;
   means mounting the shank within the bore of the chuck for operative driving engagement therewith and adapted for longitudinal movement relatively thereto on the tool encountering extreme resistance by said workpiece due to existence of no tool, a broken tool or an improperly set tool;
   the means for mounting the shank for driving engagement with the chuck including a plurality of longitudinal parallel slots formed through said chuck communicating with its bore;
   corresponding parallel grooves formed on the exterior of said shank;
   and a ball interposed between and nested respectively in each adjacent slot and groove;
   compression spring means within the bores of said shank and chuck yieldably resisting relative longitudinal movement of said shank and chuck towards each other and normally biasing said shank and chuck outwardly of each other;
   cam means on said chuck; yieldable restraining means on said shank normally engaging said chuck cam means preventing relative movement of said chuck and shank towards each other;
   whereby upon initial rotary drive and longitudinal feed of said chuck, and the engagement of the tool and workpiece, said yieldable restraining means retains said chuck and shank against relative longitudinal compressive movement to provide an initial high thrust of the tool upon the workpiece, whereby upon successive rotary movements of said shank and chuck, said relative movement is resisted;
   and wherein, upon extreme resistance encountered, by said tool, said restraining means is compressively engaged by said cam means and; cammed radially inward providing relative longitudinal movement of said chuck and shank towards each other.

2. In the hard start tool holder of claim 1, said spring means comprising a plurality of elongated concentrically arranged coil springs.

3. In the hard start tool holder of claim 1, said compression spring means comprising three elongated concentrically arranged coil springs.

4. In the hard start tool holder of claim 1, there being an annular exterior groove on said shank;
   said yieldable restraining means comprising a snap ring loosely mounted in said groove and extending radially outward thereof;
   said cam means being an annular cam means on the interior of said chuck bearing against said snap ring, and adapted on extreme axial tool and workpiece resistance to cam said snap ring into said shank groove.

5. In the hard start tool holder of claim 4, said chuck at one end having a counterbore normally receiving and enclosing said snap ring.

* * * * *